United States Patent
Yoshioka et al.

(10) Patent No.: US 10,848,208 B2
(45) Date of Patent: Nov. 24, 2020

(54) WIRELESS BASE STATION AND WIRELESS COMMUNICATION METHOD

(71) Applicant: NTT DOCOMO, INC., Tokyo (JP)

(72) Inventors: Shohei Yoshioka, Tokyo (JP); Satoshi Suyama, Tokyo (JP); Jun Mashino, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/487,916

(22) PCT Filed: Dec. 18, 2017

(86) PCT No.: PCT/JP2017/045367
§ 371 (c)(1),
(2) Date: Aug. 22, 2019

(87) PCT Pub. No.: WO2018/154937
PCT Pub. Date: Aug. 30, 2018

(65) Prior Publication Data
US 2019/0386713 A1    Dec. 19, 2019

(30) Foreign Application Priority Data

Feb. 24, 2017 (JP) .................................. 2017-033671

(51) Int. Cl.
*H04B 7/0413* (2017.01)
*H04B 7/0456* (2017.01)
*H04B 7/06* (2006.01)

(52) U.S. Cl.
CPC ......... *H04B 7/0413* (2013.01); *H04B 7/0456* (2013.01); *H04B 7/0617* (2013.01)

(58) Field of Classification Search
CPC .. H04B 7/0413; H04B 7/0456; H04B 7/0617; H04B 7/0417; H04B 7/0408; H04B 7/0452; H04L 27/26; H04W 16/28
See application file for complete search history.

(56) References Cited

U.S. PATENT DOCUMENTS

2005/0265275 A1* 12/2005 Howard ............... H04B 7/0671
                                                                      370/328
2006/0146760 A1*  7/2006 Khandekar ............ H04L 5/006
                                                                      370/335
2015/0043463 A1   2/2015 Yamazaki

FOREIGN PATENT DOCUMENTS

JP    2010-539807 A   12/2010
JP    2016-006984 A    1/2016
WO    2013/129502 A1   9/2013

OTHER PUBLICATIONS

International Search Report issued in PCT/JP2017/045367 dated Mar. 6, 2018 (5 pages).

(Continued)

*Primary Examiner* — Vineeta S Panwalkar
(74) *Attorney, Agent, or Firm* — Osha Bergman Watanabe & Burton LLP

(57) ABSTRACT

In a radio communication system that performs beamforming in MIMO transmission between a radio base station and at least one user terminal, radio base station (10) includes: weight control section (104) that determines a beamforming weight used for the beamforming, for each of subbands formed by dividing a transmission band; and communication section (109) that transmits a signal to which the beamforming is applied using the beamforming weight.

4 Claims, 8 Drawing Sheets

(56) References Cited

OTHER PUBLICATIONS

Written Opinion of the International Searching Authority issued in PCT/JP2017/045367 dated Mar. 6, 2018 (4 pages).
Obara, T. et al.; "Joint Processing of Analog Fixed Beamforming and CSI-based Precoding for Super High Bit Rate Massive MIMO Transmission Using Higher Frequency Bands"; IEICE Transactions on Communications, vol. E98-B, No. 8, Aug. 2015, pp. 1474-1481 (8 pages).

* cited by examiner

WIRELESS BASE STATION AND WIRELESS COMMUNICATION METHOD

TECHNICAL FIELD

The present invention relates to a radio base station and a radio communication method.

BACKGROUND ART

In a UMTS (Universal Mobile Telecommunications System) network, Long Term Evolution (LTE) is specified for a higher data rate, lower latency, and the like. For a broader bandwidth and a higher speed based on LTE, successor systems of LTE are also studied (for example, the systems are called LTE-A (LTE-Advanced), FRA (Future Radio Access), 5G (5th generation mobile communication system), 5G+(5G plus), and New-RAT (Radio Access Technology)).

In a future radio communication system (for example, 5G), the use of Massive MIMO (Multiple Input Multiple Output) using a large number of antenna elements (for example, more than 100 elements) in a high frequency band (for example, 5 GHz or higher) is studied to further increase the speed and reduce the interference in signal transmission.

An example of a technique of controlling beams or streams in MIMO includes a method of combining digital precoding and digital postcoding (hereinafter, simply referred to as precoding and postcoding in some cases) and beamforming (BF) (for example, see NPL 1). In the BF, a BF weight is used to form an optimal beam according to a propagation path.

CITATION LIST

Non-Patent Literature

NPL 1

T. Obara et al.: "Joint Processing of Analog Fixed Beamforming and CSI-based precoding for Super High Bit Rate Massive MIMO Transmission Using Higher Frequency Bands," IEICE Transactions on Communications VOL. E98-B, NO. 8 Aug. 2015

SUMMARY OF INVENTION

Technical Problem

Frequency characteristics in a transmission band vary depending on the frequency selectivity of a channel between a radio base station and a user terminal. Therefore, when the same BF weight is selected for the entire transmission band in performing the BF, the BF weight may not be appropriate depending on the frequency in the transmission band.

An aspect of the present invention provides a radio base station and a radio communication method that can appropriately select a BF weight.

Solution to Problem

An aspect of the present invention provides a radio base station in a radio communication system that performs beamforming in MIMO transmission between the radio base station and at least one user terminal, the radio base station including: a control section that determines a beamforming weight used for the beamforming, for each of subbands formed by dividing a transmission band; and a transmission section that transmits a signal to which the beamforming is applied using the beamforming weight.

Advantageous Effects of Invention

According to the aspect of the present invention, the BF weight can be appropriately selected.

DESCRIPTION OF EMBODIMENTS

Figure 1:
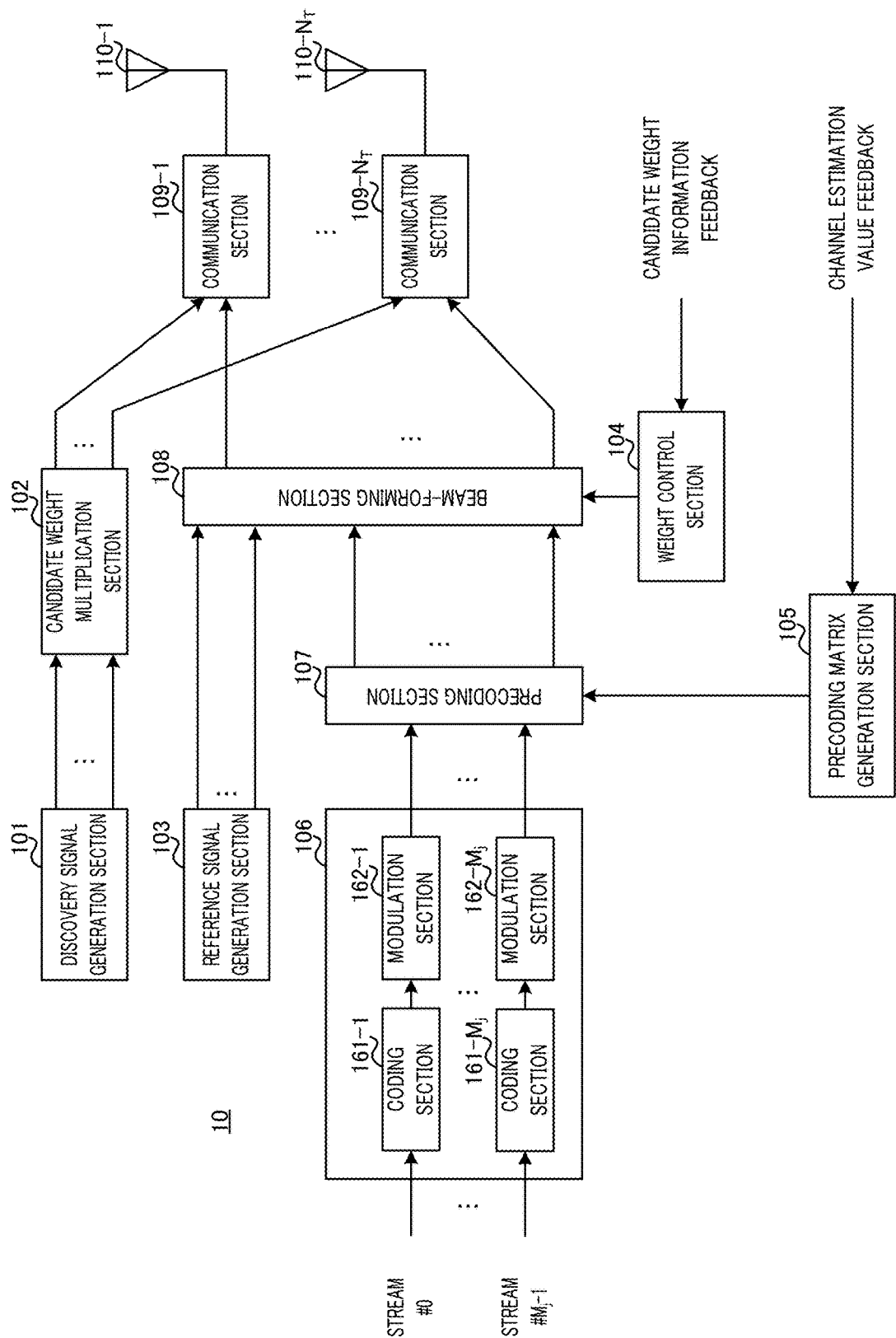
FIG. 1 is a block diagram showing a configuration example of a radio base station according to an embodiment.

Hereinafter, embodiments of the present invention will be described in detail with reference to the accompanying drawings.

Streams are distributed and multiplexed for a plurality of user terminals in MU-MIMO (Multi-User MIMO) transmission in the case described below. BF and precoding/postcoding are performed in Massive MIMO in the case described below.

Hereinafter, the precoding will be sorted into precoding for inter-user interference (IUI) and precoding for inter-stream interference (ISI) in each user terminal. Precoding is performed for the inter-user interference, and precoding and postcoding are performed for the inter-stream interference in each user terminal.

In an example illustrated below, the radio base station includes $N_T$ antenna elements and performs Massive MIMO transmission in the downlink between the radio base station and $N_U$ user terminals. The number of antenna elements of an i-th (i=1 to $N_U$) user terminal is $N_{Ri}$, and the number of streams is $M_i$.

In this case, reception signal r received by each user terminal is expressed by the following equation 1.

[1]

$$r = \begin{bmatrix} r_0 \\ r_1 \\ \vdots \\ r_{N_U-1} \end{bmatrix} = \begin{bmatrix} H_0 \\ H_1 \\ \vdots \\ H_{N_U-1} \end{bmatrix} WP \begin{bmatrix} d_0 \\ d_1 \\ \vdots \\ d_{N_U-1} \end{bmatrix} + z$$
$$= \begin{bmatrix} H_0 \\ H_1 \\ \vdots \\ H_{N_U-1} \end{bmatrix} WP^{IUI}P^{ISI} \begin{bmatrix} d_0 \\ d_1 \\ \vdots \\ d_{N_U-1} \end{bmatrix} + z$$
$$= \begin{bmatrix} \tilde{H}_0 P_0^{ISI} & & 0 \\ & \tilde{H}_1 P_1^{ISI} & \\ & & \ddots \\ 0 & & \tilde{H}_{N_U-1} P_{N_U-1}^{ISI} \end{bmatrix} \begin{bmatrix} d_0 \\ d_1 \\ \vdots \\ d_{N_U-1} \end{bmatrix} + z$$

(Equation 1)

Here, $H_j$ (j=0 to $N_U-1$) represents channel information (channel matrix) of the j-th user terminal multiplexed in the MU-MIMO transmission, W represents a BF weight, $P^{IUI}$ represents a precoding matrix for the inter-user interference, $P^{ISI}$ represents a precoding matrix for the inter-stream interference, $d_j$ (j=0 to $N_U-1$) represents a stream for the j-th user terminal, and z represents noise.

As shown in equation 1, precoding ($P^{IUI}$) for the inter-user interference in the precoding (for example, block diagonalization) orthogonalizes the channels between the user terminals and prevents the inter-user interference.

Signal y obtained by postcoding of reception signal r received by each user terminal is expressed by the following equation 2.

[2]

$$y = \begin{bmatrix} y_0 \\ y_1 \\ \vdots \\ y_{N_U-1} \end{bmatrix} = \begin{bmatrix} B_0^{ISI} r_0 \\ B_1^{ISI} r_1 \\ \vdots \\ B_{N_U-1}^{ISI} r_{N_U-1} \end{bmatrix} = \mathrm{diag}(\ldots) \begin{bmatrix} d_0 \\ d_1 \\ \vdots \\ d_{N_U-1} \end{bmatrix} + \tilde{z}$$

(Equation 2)

In equation 2, $B_j^{ISI}$ (j=0 to $N_U-1$) represents a postcoding matrix of the inter-stream interference for the j-th user terminal. As shown in equation 2, precoding matrix $P^{ISI}$ and postcoding matrix $B^{ISI}$ orthogonalize the channels between the streams of the user terminals and prevent the inter-stream interference.

Note that precoding matrices ($P^{IUI}$, $P^{ISI}$) and postcoding matrix ($B^{ISI}$) may be computed by, for example, singular value decomposition (SVD) using channel information (channel matrix) between the radio base station and the user terminal.

In the following embodiment, a subcarrier forming a transmission band used by the radio base station to transmit a signal is divided into a plurality of groups (hereinafter, referred to as "subbands") (divided into subbands), and methods of selecting the BF weight for each subband (group) will be described.

<Radio Communication System>

The radio communication system according to the present embodiment includes at least one radio base station (equivalent to transmitter) 10 and at least one user terminal 20 (equivalent to receiver). The radio base station 10 is, for example, a Massive MIMO base station. User terminal 20 is connected to (accesses) radio base station 10.

<Radio Base Station>

FIG. 1 illustrates an example of an overall configuration of the radio base station according to the present embodiment. Radio base station 10 shown in FIG. 1 includes discovery signal generation section 101, candidate weight multiplication section 102, reference signal generation section 103, weight control section 104, precoding matrix generation section 105, data generation section 106, precoding section 107, beamforming section 108, communication sections 109, and antennas 110.

Figure 2:
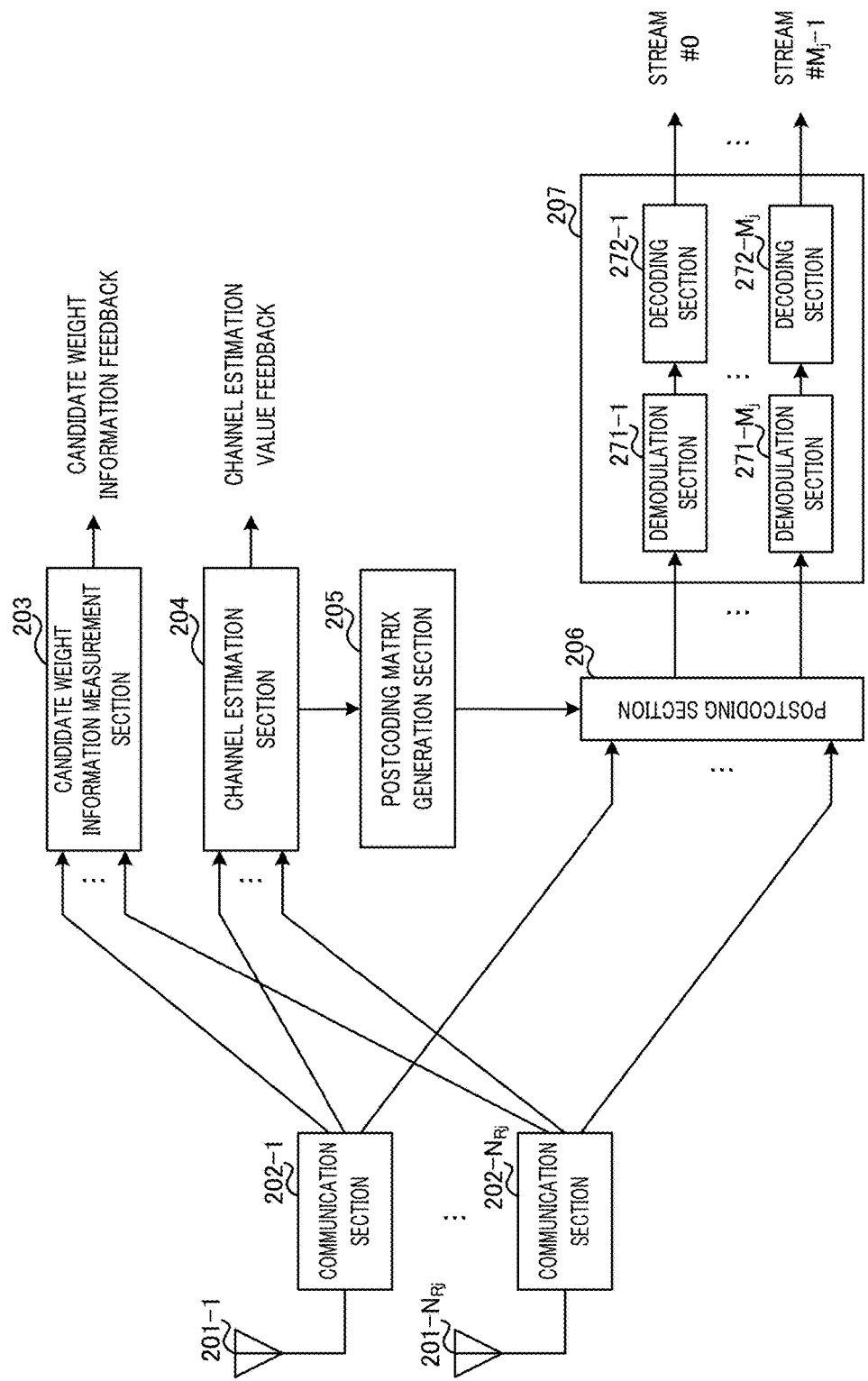
FIG. 2 is a block diagram showing a configuration example of a user terminal according to the embodiment.

Note that constituent sections (for example, IFFT processing section and CP adding section) and the like for generating an OFDM (Orthogonal Frequency Division Multiplexing) signal in radio base station 10 are not illustrated in FIG. 2. Furthermore, the signal waveform of the signal transmitted from radio base station 10 is not limited to the waveform based on OFDM modulation.

Discovery signal generation section 101 generates discovery signals (reference signals) for determining BF weight (W). For example, discovery signal generation section 101 generates at least the same number of discovery signals as the number of candidates of the BF weight. Discovery signal generation section 101 outputs the generated discovery signals to candidate weight multiplication section 102.

Candidate weight multiplication section 102 multiplies the discovery signals input from discovery signal generation section 101 by the candidates of the BF weight, respectively, and outputs the discovery signals multiplied by the BF weight candidates to communication sections 109.

Reference signal generation section 103 generates a reference signal used for channel estimation and outputs the reference signal to beamforming section 108.

Weight control section 104 determines BF weight (W) to be used for beamforming from the BF weight candidates based on the candidate weight information fed back from each user terminal 20. Specifically, weight control section 104 selects BF weights for a pattern of a case in which the transmission band used by radio base station 10 is not divided into subbands (that is, when the same BF weight is used in all bands) and for a pattern of a case in which the transmission band is divided into subbands. In other words, weight control section 104 determines the BF weight to be used for beamforming, for each of a plurality of subbands formed by dividing the transmission band.

When the transmission band is divided into subbands, weight control section 104 may also select the BF weights for patterns corresponding to different methods of forming the subbands (different numbers of subbands).

For example, weight control section 104 may select L BF weights not overlapping with each other, in descending order of SNR (Signal to Noise Ratio) or received power indicated in the candidate weight information, on the basis of the selection unit (entire transmission band or subbands) of the BF weights of each pattern.

Weight control section 104 determines the BF weight to be used by beamforming section 108 from the BF weights corresponding to the plurality of patterns. For example, weight control section 104 uses the candidate weight information fed back from user terminals 20 to compute SIR (Signal to Interference power Ratio) indicating the signal to site interference power ratio in the case that the BF weight in each pattern is used. Weight control section 104 may determine the BF weight of the pattern with the maximum SIR as the BF weight to be used by beamforming section 108 (that is, maximum signal to interference power ratio standard). Weight control section 104 outputs the determine BF weight (pattern) to beamforming section 108.

Precoding matrix generation section 105 uses the channel estimation values fed back from user terminals 20 to generate the precoding matrix. Note that the channel estimation value is, for example, channel information (HW) indicating the equivalent channel matrix including BF weight (W). Specifically, precoding matrix generation section 105 generates precoding matrix ($P^{IUI}$) for removing the interference between a plurality of user terminals 20 (inter-user interference) multiplexed in the MU-MIMO and precoding matrix ($P^{ISI}$) for removing the interference between a plurality of streams (inter-stream interference) in each user terminal 20. Precoding matrix generation section 105 outputs generated precoding matrices (($P^{IUI}$, $P^{ISI}$), hereinafter, collectively referred to as "P" in some cases) to precoding section 107.

Data generation section 106 generates data (downlink signals) for a plurality of user terminals 20. Note that FIG. 1 shows a configuration of data generation section 106 for one user terminal 20 (j-th user terminal 20). However, radio base station 10 includes data generation sections 106 corresponding to a plurality of ($N_U$) user terminals 20.

Data generation section 106 includes coding sections 161 and modulation sections 162. Coding sections 161 and modulation sections 162 are provided according to the number of streams ($M_j$) for user terminal j. Each coding section 161 encodes data signals of $M_j$ streams. Each modulation section 162 modulates the encoded data signals and outputs the modulated data signals to precoding section 107. Note that the code rate and the modulation scheme in each coding section 161 and each modulation section 162 may be different in each stream.

Precoding section 107 multiplies the data signal input from data generation section 106 by precoding matrix (P) input from precoding matrix generation section 105 and outputs the data signal after the precoding to beamforming section 108. For example, precoding section 107 applies precoding to the data signals of M streams to generate L (the number of beams, for example, L>M) signals.

In the channel estimation, beamforming section 108 multiplies the reference signal input from reference signal generation section 103 by BF weight W input from weight control section 104 and outputs the reference signal after the BF weight multiplication to communication section 109. According to the processing, each user terminal 20 can use the reference signal multiplied by BF weight (W) determined based on the candidate weight information (for example, SNR or received power) to estimate equivalent channel information (HW) including the BF weight.

At data transmission, beamforming section 108 multiplies the data signals input from precoding section 107 by BF weight (W) input from weight control section 104 and outputs the data signals ($N_T$ signals) after the BF weight multiplication to communication section 109.

Communication sections 109-1 to 109-$N_T$ are provided according to $N_T$ antennas 110 (antenna elements). Each communication section 109 applies transmission processing, such as D/A conversion and up-conversion, to the input signals. Each communication section 112 multiplexes the signals after the transmission processing based on, for example, time-division, frequency-division, or code-division multiplexing and transmits the signals from $N_T$ antennas 110, respectively. Specifically, each communication section 109 transmits the discovery signal input from candidate weight multiplication section 102 to each user terminal 20 through antenna 110. In the channel estimation, communication section 109 transmits the reference signal input from beamforming section 108 to each user terminal 20 through antenna 110. At data transmission, communication section 109 transmits the signal of the stream input from beamforming section 108 to each user terminal 20 through antenna 110.

<User Terminal>

FIG. 2 illustrates an example of an overall configuration of the user terminal according to the present embodiment. User terminal 20 shown in FIG. 2 includes antennas 201, communication sections 202, candidate weight information measurement section 203, channel estimation section 204, postcoding matrix generation section 205, postcoding section 206, and data reception section 207.

Note that FIG. 2 shows an example of the configuration of j-th user terminal 20. Constituent sections (for example, CP removing section and FFT processing section) and the like for receiving the OFDM signal in user terminal 20 are not illustrated in FIG. 2. The signal waveform of the signal received by user terminal 20 is not limited to the waveform based on the OFDM modulation.

Communication sections 202-1 to 202-$N_{Rj}$ are provided according to $N_{Rj}$ antennas 201, respectively. Each communication section 202 applies reception processing, such as down-conversion and A/D conversion, to the reception signals received through antenna 201. Here, examples of the reception signals include the discovery signal, the reference signal, and the data signal. Communication section 202 outputs the discovery signal to candidate weight information measurement section 203, outputs the reference signal to channel estimation section 204, and outputs the data signal to postcoding section 206.

Candidate weight information measurement section 203 uses the discovery signals input from communication sections 202 to measure the candidate weight information (for example, SNR or received power). The discovery signals are multiplied by the BF weight candidates, respectively. Therefore, candidate weight information measurement section 203 measures the SNR or the received power for each BF weight candidate used. The candidate weight information indicating the measured SNR or received power is fed back to radio base station 10 (weight control section 104) through, for example, communication section 202.

Channel estimation section 204 uses the reference signal input from communication section 202 to estimate the channel estimation value (channel information) indicating the channel between radio base station 10 and user terminal 20. The reference signal is multiplied by BF weight (W) in radio base station 10 (beamforming section 108). Therefore, channel estimation section 204 estimates equivalent channel information including the BF weight (equivalent channel matrix HW). Estimated channel information (HW) is fed back to radio base station 10 (precoding matrix generation section 105) through, for example, communication section 202. Channel estimation section 204 also outputs the estimated channel information to postcoding matrix generation section 205.

Postcoding matrix generation section 205 uses channel information (HW) input from channel estimation section 204 to generate postcoding matrix ($B^{ISI}$). Postcoding matrix generation section 205 outputs the generated postcoding matrix to postcoding section 206. Note that postcoding matrix generation section 205 may use channel information HWP estimated by using the reference signal multiplied by the precoding matrix and the BF weight to generate the postcoding matrix.

Postcoding section 206 uses postcoding matrix ($B^{ISI}$) input from postcoding matrix generation section 205 to perform postcoding of the data signal input from communication section 202. Postcoding section 206 outputs the data signal after the postcoding to data reception section 207.

Data reception section 207 applies reception processing (including demodulation processing and decoding processing) to the data signal input from postcoding section 206 and obtains a plurality of streams for j-th user terminal 20. Data reception section 207 includes demodulation sections 271 and decoding sections 272. Demodulation sections 271 and decoding sections 272 are provided according to the number of streams ($M_j$) for j-th user terminal 20. Each demodulation section 271 demodulates the data signals of $M_j$ streams, and each decoding section 272 decodes the demodulated data signals to obtain $M_j$ streams. Note that the code rate and the modulation scheme in each demodulation section 271 and each decoding section 272 may be different in each stream.

<Operation of Radio Base Station 10 and User Terminal 20>

Next, operation of radio base station 10 and user terminal 20 will be described in detail.

Figure 3:
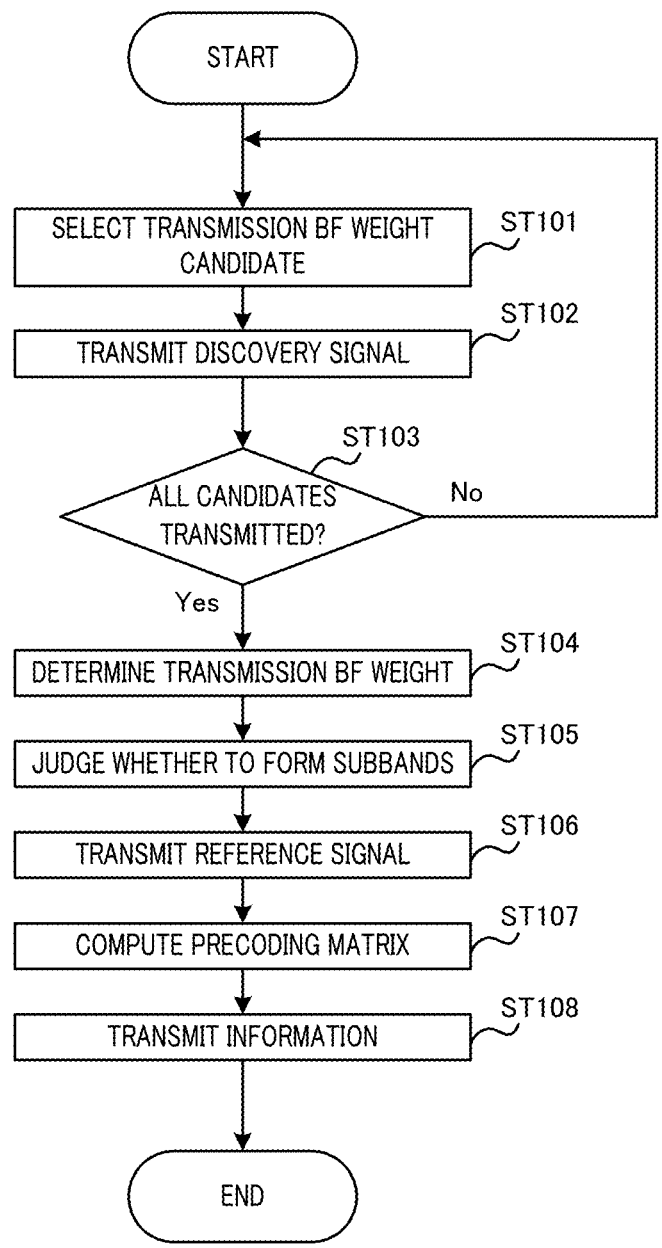
FIG. 3 is a flow chart showing an operation example of the radio base station according to the embodiment.

FIG. 3 is a flow chart showing an operation of radio base station 10 according to the present embodiment.

First, radio base station 10 selects one of the candidates for BF weight (W)(BF weight candidates) (ST101). Radio base station 10 then transmits the discovery signal multiplied by the selected BF weight candidate to user terminal 20 (ST102). If radio base station 10 has not transmitted the discovery signals corresponding to all of the BF weight candidates (ST103: No), radio base station 10 returns to the processing of ST101 and ST102 and transmits the discovery signal multiplied by another BF weight candidate.

The discovery signal multiplied by the candidate for the BF weight is not precoded and is transmitted to all antennas 201 of all user terminals 20. The discovery signal may be assigned to, for example, radio resources (subcarriers) in one symbol (for example, one OFDM symbol) based on frequency-division multiplexing or may be assigned to a plurality of symbols based on time-division multiplexing. The discovery signal may also be transmitted between a plurality of radio base stations 10 based on time-division multiplexing, frequency-division multiplexing, or code-division multiplexing. In this way, the BF weight described later can be efficiently selected by multiplexing and transmitting the discovery signals to the radio resources. Note that details of the transmission method of the discovery signal will be described later.

Each user terminal 20 uses the reception signal (discovery signal) to measure the candidate weight information (for example, SNR or received power) and feeds back the candidate weight information to radio base station 10.

After transmitting the discovery signals corresponding to all of the BF weight candidates (ST103: Yes), radio base station 10 selects BF weight (W) to be used for beamforming from the BF weight candidates based on the candidate weight information fed back from each user terminal 20 (ST104). Radio base station 10 may, for example, select L BF weights not overlapping with each other, in descending order of SNR or received power indicated in the candidate weight information.

In this case, radio base station 10 selects BF weight (W) for each of the pattern in which the subbands are not formed and the pattern in which the subbands are formed (one or a plurality of patterns). For example, BF weight vector $W_i^{opt}$ formed by L BF weights corresponding to an i-th subband is expressed by the following equation 3.

[3]

$$W_i^{opt} = [w_{i,1} \cdots w_{i,L}]$$

Equation 3

For example, when the transmission band is divided into two subbands (i=1, 2), radio base station 10 selects BF weights ($W_1^{opt}, W_2^{opt}$) corresponding to the subbands. Similarly, when the transmission band is divided into four subbands (i=1 to 4), radio base station 10 selects BF weights ($W_1^{opt}, W_2^{opt}, W_3^{opt}, W_4^{opt}$) corresponding to the subbands. Therefore, radio base station 10 selects BF weight $W_i^{opt}$ corresponding to each subband.

Note that elements $w_{i,l}$ (l=1 to L) of equation 3 are expressed by angle candidates (elevation angle $\phi_c^{opt}$ and azimuth $\theta_c^{opt}$) of the beam as indicated in equation 4.

[4]

$$W_{i,l} = W_l(\phi_c^{opt}, \theta_c^{opt})$$

Equation 4

Therefore, in ST 104, radio base station 10 selects BF weight (W) of the case in which the subbands are not formed and optimal BF weights ($W_i^{opt}$ corresponding to the number of subbands of at least one type) of the case in which the subbands are formed.

Next, radio base station 10 determines the BF weight to be actually used for beamforming from the BF weights of the patterns selected in ST104 (ST105). More specifically, radio base station 10 selects one of the BF weight for each of a plurality of subbands and the BF weight for the entire transmission band. In other words, radio base station 10 judges whether to divide the transmission band into a plurality of subbands and judges the type of subband configuration if the subbands are to be formed. For example, radio base station 10 may determine the BF weight of the pattern with the maximum SIR among the plurality of patterns based on the maximum signal to interference power ratio standard.

Radio base station 10 then multiplies the reference signal by the BF weight determined in ST 105 and transmits the reference signal multiplied by the BF weight to user terminal 20 (ST106).

User terminal 20 uses the received reference signal to estimate channel information (HW) and feeds back estimated channel information HW (channel estimation value) to radio base station 10. For example, user terminal 20 uses the reference signal multiplied by BF weight ($W_i$) of an i-th subband to estimate the channel information (equivalent channel matrix $H(n)W_i$) (n is a subcarrier number of the subcarrier forming subband i).

User terminal 20 also uses estimated channel information $H(n)W_i$ to generate (compute) postcoding matrix ($B^{ISI}$). Note that as described above, user terminal 20 may use channel information $H(n)W_iP_i(n)$ including precoding matrix (P) generated in ST107 described later to generate postcoding matrix $B_i(n)$.

On the other hand, radio base station 10 uses channel information HW fed back from user terminal 20 to generate precoding matrix (P) (ST107). For example, radio base station 10 uses channel information $H(n)W_i$ fed back from user terminal 20 to compute precoding matrix $P_i(n)$ for the i-th subband.

Radio base station 10 then multiplies the signal (information) of the stream by precoding matrix ($P_i(n)$) and BF weight ($W_i$) of each subband (each subcarrier n) and transmits the signal of the stream to user terminal 20 (ST108).

The inter-user interference is rejected in the data multiplied by precoding matrix ($P^{IUI}$). User terminal 20 multiplies the received signal of the stream by postcoding matrix ($B^{ISI}$)

to demodulate the signal (data) of the stream (not shown). The inter-stream interference is rejected in the data multiplied by precoding matrix ($P^{ISI}$) and postcoding matrix ($B^{ISI}$).

Next, methods of dividing the transmission band into subbands will be described. Hereinafter, method 1 and method 2 of forming the subbands will be described as an example.

[Method 1]

In method 1, one subband includes adjacent subcarriers (the number of subcarriers: $N_{sb}$) among N subcarriers forming the transmission band of radio base station 10. Therefore, each subband includes local subcarriers contiguous in the frequency domain in method 1.

For example, an i-th subband includes subcarriers $n=((i-1)\times N_{sb}+1)$ to $i\times N_{sb}$.

Figure 4A:
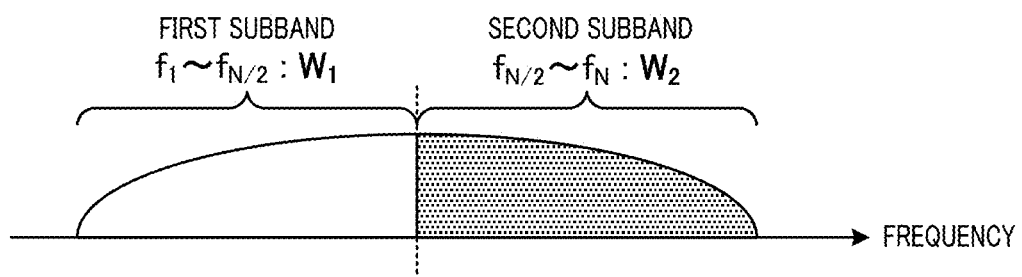
FIG. 4A illustrates an example of subbands according to method 1 of the embodiment.

FIG. 4A shows an example of dividing the transmission band into two subbands (i=1, 2) in method 1. As shown in FIG. 4A, bands of frequencies $f_1$ to $f_{N/2}$ (subcarriers n=1 to $N_{sb}$) of frequencies $f_1$ to $f_N$ equivalent to N subcarriers forming the transmission band form a first subband, and bands of frequencies $f_{N/2}$ to $f_N$ (subcarriers $n=N_{sb}+1$ to $2N_{sb}$) form a second subband.

Radio base station 10 may use the candidate weight information (for example, received power) fed back from user terminal 20 based on, for example, a maximum received power standard indicated in the following equation 5 to select BF weights (for example, $w_{i,1}$ indicated in equation 4) of the i-th subband.

[5]

$$(\phi_c^{opt}, \theta_c^{opt}) = \underset{j,\phi_c,\theta_c}{\mathrm{argmax}} \sum_{n=(i-1)N_{sb}+1}^{iN_{sb}} \|H_j(n)w_i(\phi_c, \theta_c)p_l(n) + z_j(n)\|^2 \quad \text{Equation 5}$$

More specifically, for j-th user terminal 20, radio base station 10 selects BF weights $w_{i,1}$ corresponding to angle candidates ($\phi_c^{opt}$, $\theta_c^{opt}$) that maximize the received power of discovery signals $p_1(n)$ transmitted by multiplying BF weight candidates $w_i(\phi_c, \theta_c)$ in subcarriers n forming the i-th subband.

Figure 4B:
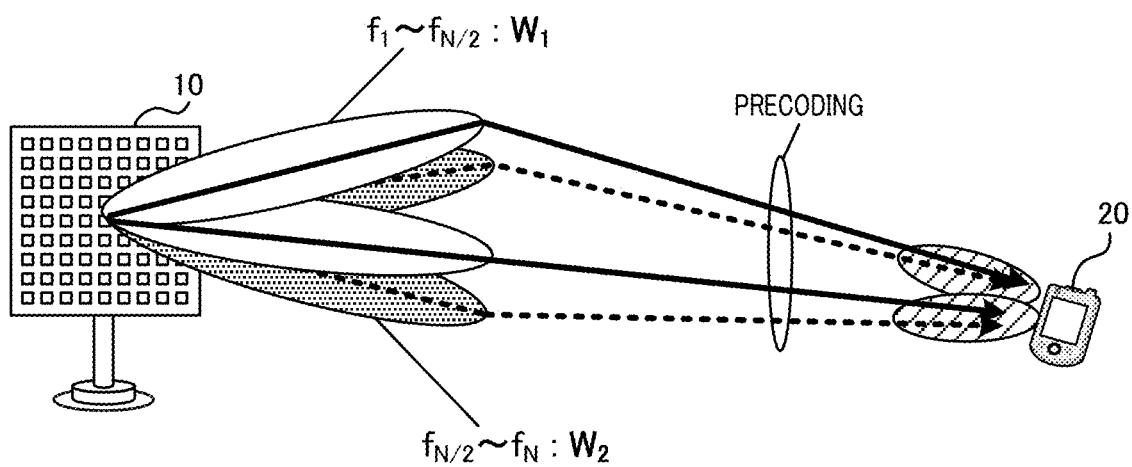
FIG. 4B illustrates an operation example of BF and precoding according to method 1 of the embodiment.

FIG. 4B shows transmission of streams based on the BF weights selected for each subband shown in FIG. 4A. As shown in FIG. 4B, in the first subband (frequencies $f_1$ to $f_{N/2}$), radio base station 10 transmits streams after applying BF by using BF weight vector $W_1$ formed by BF weights $w_{1,1}$ selected for the first subband. In the second subband (frequencies $f_{N/2}$ to $f_N$), radio base station 10 transmits streams after applying BF by using BF weight vector $W_2$ formed by BF weights $w_{2,1}$ selected for the second subband.

In this way, radio base station 10 can select the BF weights according to, for example, the frequency characteristics of each of the first subband and the second subband in the frequency bands shown in FIG. 4A. In method 1, each subband is formed by adjacent (contiguous) subcarriers. Therefore, radio base station 10 can accurately select the BF weights according to the frequency characteristics between radio base station 10 and user terminal 20 of each subband, and this can improve the transmission efficiency of beamforming in each subband.

[Method 2]

In method 2, one subband includes subcarriers at equal intervals $M_{sb}$ among the N subcarriers forming the transmission band of radio base station 10. Therefore, each subband includes subcarriers discontiguous and dispersed in the frequency domain in method 2.

For example, the i-th subband includes subcarriers n=i, $M_{sb}+1$, $2M_{sb}+1$, . . . .

Figure 5A:
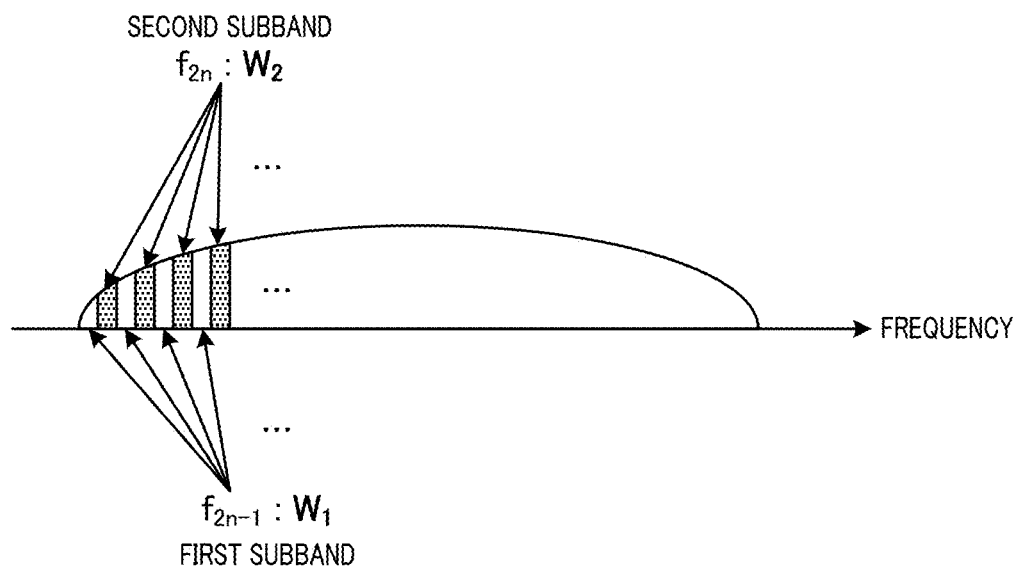
FIG. 5A illustrates an example of subbands according to method 2 of the embodiment.

FIG. 5A shows an example of dividing the transmission band into two subbands (i=1, 2) in method 2. In FIG. 5A, $M_{sb}=2$ is set. As shown in FIG. 5A, bands (n=1, 3, 5, . . . ) with frequencies $f_{2n-1}$ among frequencies $f_1$ to $f_N$ equivalent to N subcarriers forming the transmission band form a first subband, and bands (n=2, 4, 6, . . . ) with frequencies $f_{2n}$ form a second subband.

Radio base station 10 may use the candidate weight information (for example, received power) fed back from user terminal 20 based on, for example, a maximum received power standard indicated in the following equation 6 to select BF weights (for example, $w_{i,1}$ indicated in equation 4) of the i-th subband.

[6]

$$(\phi_c^{opt}, \theta_c^{opt}) = \underset{j,\phi_c,\theta_c}{\mathrm{argmax}} \sum_n \|H_j(nM_{sb}+i)w_i(\phi_c, \theta_c)p_l(nM_{sb}+i) + z_i(nM_{sb}+i)\|^2 \quad \text{Equation 6}$$

More specifically, for j-th user terminal 20, radio base station 10 selects BF weights $w_{i,1}$ corresponding to angle candidates ($\phi_c^{opt}$, $\theta_c^{opt}$) that maximize the received power of discovery signals $p_1(n)$ transmitted by multiplying BF weight candidates $w_i(\phi_c, \theta_c)$ in subcarriers n forming the i-th subband.

Figure 5B:
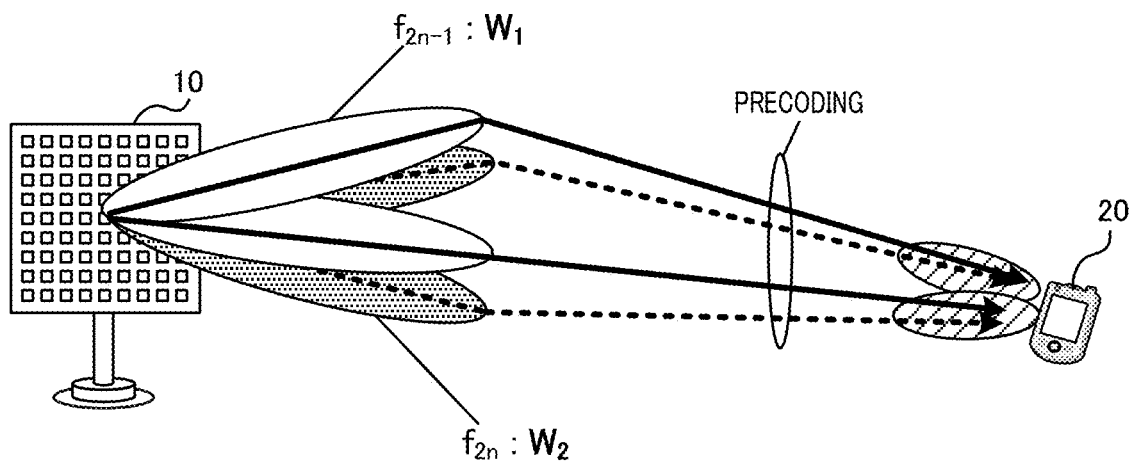
FIG. 5B illustrates an operation example of BF and precoding according to method 2 of the embodiment.

FIG. 5B shows transmission of streams based on the BF weights selected for each subband shown in FIG. 5A. As shown in FIG. 5B, in the first subband (frequencies $f_{2n-1}$), radio base station 10 transmits streams after applying BF by using BF weight vector $W_1$ formed by BF weights $w_{1,1}$ selected for the first subband. In the second subband (frequencies $f_{2n}$), radio base station 10 transmits streams after applying BF by using BF weight $W_2$ formed by BF weights $w_{2,1}$ selected for the second subband.

In this way, radio base station 10 can select the BF weights according to, for example, the frequency characteristics of each of the first subband and the second subband in the frequency bands shown in FIG. 5A. In method 2, each subband is formed by dispersed subcarriers at equal intervals.

In the channel estimation according to the beamforming scheme illustrated in the present invention, the reference signals of the beams are inserted into the subcarriers dispersed at equal intervals to reduce necessary radio resources, and the frequencies of the estimation values are interpolated. In this case, radio base station 10 can associate the subcarriers forming the subbands with the subcarriers at equal intervals to prevent an increase in the number of reference signals due to the formation of the subbands.

In this way, radio base station 10 can accurately select the BF weight of each subband according to the frequency characteristics while reducing the increase in the radio resources necessary for the channel estimation in method 2, and this can improve the transmission efficiency of beamforming in each subband.

This completes the description of the methods of forming the subbands.

Note that there are two subbands (i=1, 2) in the cases described in method 1 and method 2. However, the number of subbands may be three or more. Furthermore, the numbers of subcarriers forming the subbands are the same ($N_{sb}$) in the case described in method 1. However, the number of subcarriers forming each subband may vary between the subbands as long as there are one or more subcarriers. Furthermore, the subbands are formed by subcarriers at equal intervals ($M_{sb}$) in the case described in method 2. However, the intervals of the subcarriers forming the subbands may be unequal intervals.

In addition, the subbands formed by dividing the plurality of subcarriers forming the transmission band may be formed by a method combining method 1 and method 2. Therefore, subbands formed by contiguous subcarriers, subbands formed by subcarriers at equal intervals, and subbands formed by subcarriers at unequal intervals including contiguous subcarriers may coexist.

Next, transmission methods of the discovery signal multiplied by each BF weight candidate will be described.

First, a transmission method of the discovery signal based on method 1 will be described.

Figure 6A:
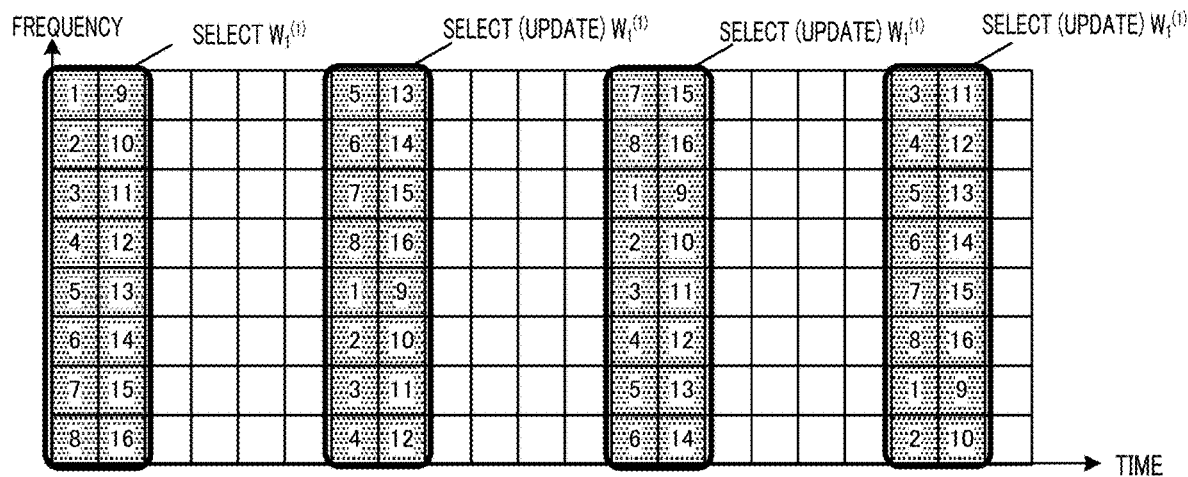
FIG. 6A illustrates an example of frame configuration according to method 1 of the embodiment.
Figure 6B:
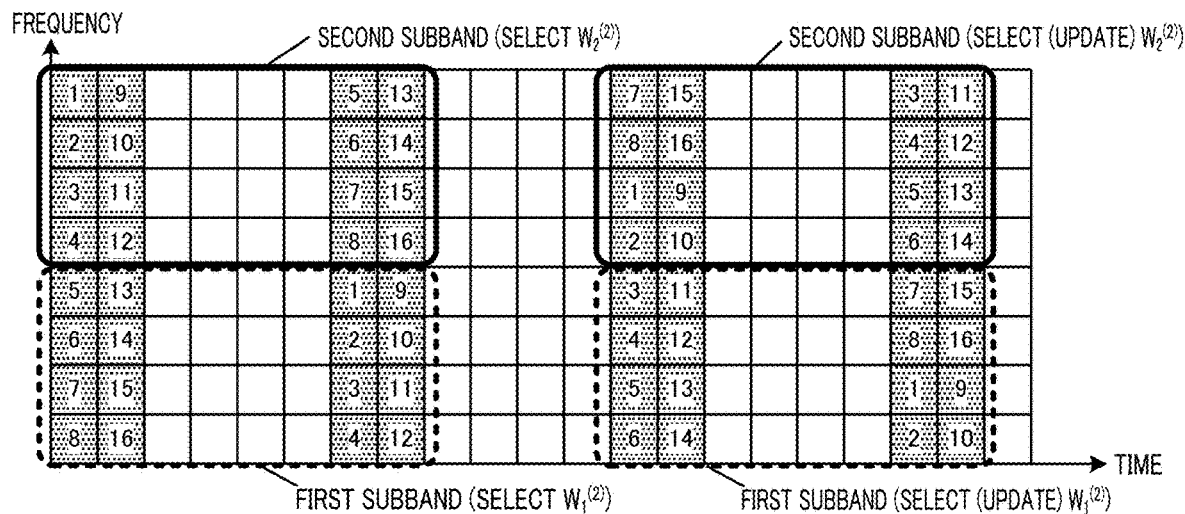
FIG. 6B illustrates an example of frame configuration according to method 1 of the embodiment.
Figure 6C:
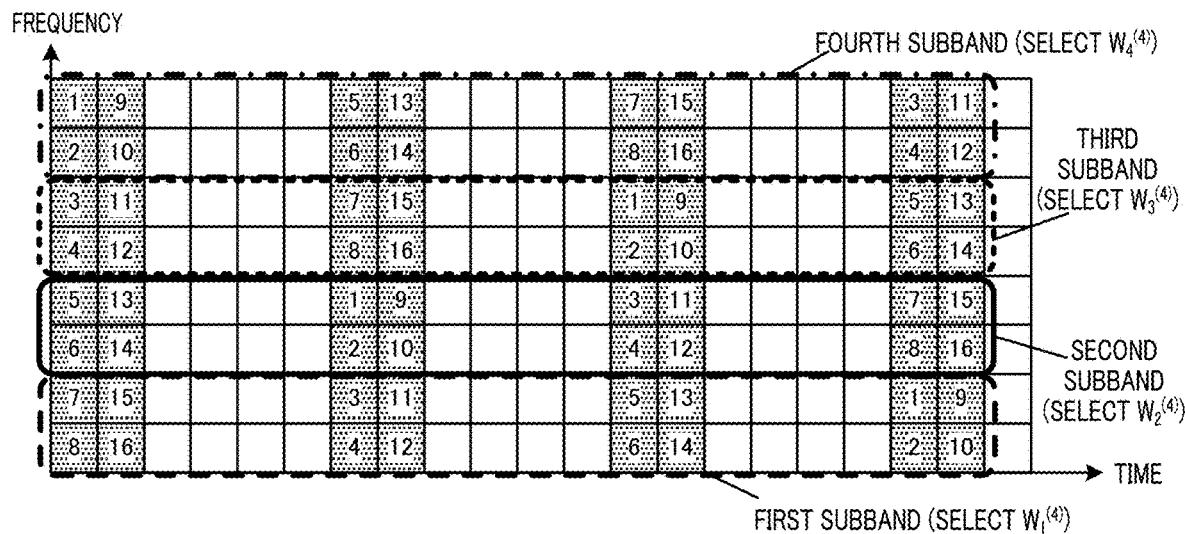
FIG. 6C illustrates an example of frame configuration according to method 1 of the embodiment.

FIGS. 6A to 6C show examples of frame configuration for transmitting the discovery signal. In FIGS. 6A to 6C, the horizontal axis denotes time domains (OFDM symbols), and the vertical axis denotes frequency domains (subcarriers). In the example of FIGS. 6A to 6C, discovery signals multiplied by BF weight candidates #1 to #16 in a transmission band of eight subcarriers are transmitted.

As shown in FIGS. 6A to 6C, the discovery signals multiplied by the BF weight candidates are periodically transmitted (every six OFDM symbols).

As shown in FIGS. 6A to 6C, the discovery signals multiplied by the BF weight candidates are transmitted by shifting the discovery signals in the frequency direction every time the discovery signals are transmitted. Specifically, in FIGS. 6A to 6C, the discovery signals multiplied by the BF weight candidates are disposed by cyclically shifting the discovery signals by four, two, and six subcarriers in the frequency direction with respect to the first transmission every time the discovery signals are transmitted. In other words, the discovery signals multiplied by all BF weight candidates in the subbands are transmitted in FIGS. 6A to 6C, and the discovery signals multiplied by the BF weight candidates are cyclically disposed.

For example, in selecting the BF weight when the subbands are not formed as shown in FIG. 6A, radio base station 10 selects one BF weight (for example, expressed as $W_i^{(1)}$) from BF weight candidates #1 to #16 based on the candidate weight information (for example, received power or SNR) generated from the discovery signals of all BF weight candidates #1 to #16 disposed across the entire transmission band (eight subcarriers) of at least one period.

On the other hand, in selecting the BF weights when the transmission band is divided into two subbands as shown in FIG. 6B, radio base station 10 selects BF weights (for example, expressed as $W_1^{(2)}$, $W_2^{(2)}$) from BF weight candidates #1 to #16 based on the candidate weight information (for example, received power or SNR) generated from the discovery signals of all BF weight candidates #1 to #16 disposed across at least two periods of each subband (four subcarriers).

Furthermore, in selecting the BF weights when the transmission band is divided into four subbands as shown in FIG. 6C, radio base station 10 selects BF weights (for example, expressed as $W_1^{(4)}$, $W_2^{(4)}$, $W_3^{(4)}$, $W_4^{(4)}$) from BF weight candidates #1 to #16 based on the candidate weight information (for example, received power or SNR generated from the discovery signals of all BF weight candidates #1 to #16 disposed across at least four periods of each subband (two subcarriers).

Next, a transmission method of the discovery signals based on method 2 will be described.

Figure 7A:
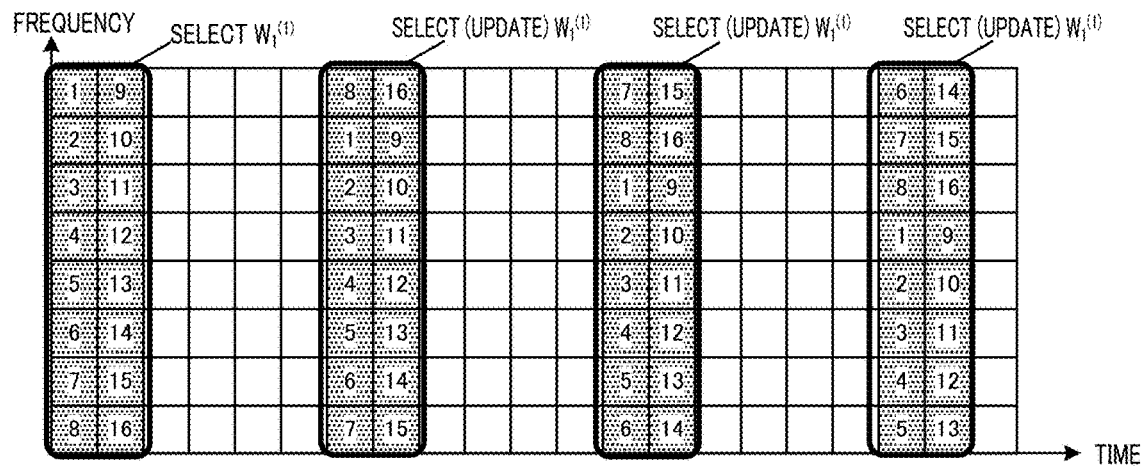
FIG. 7A illustrates an example of frame configuration according to method 2 of the embodiment.
Figure 7B:
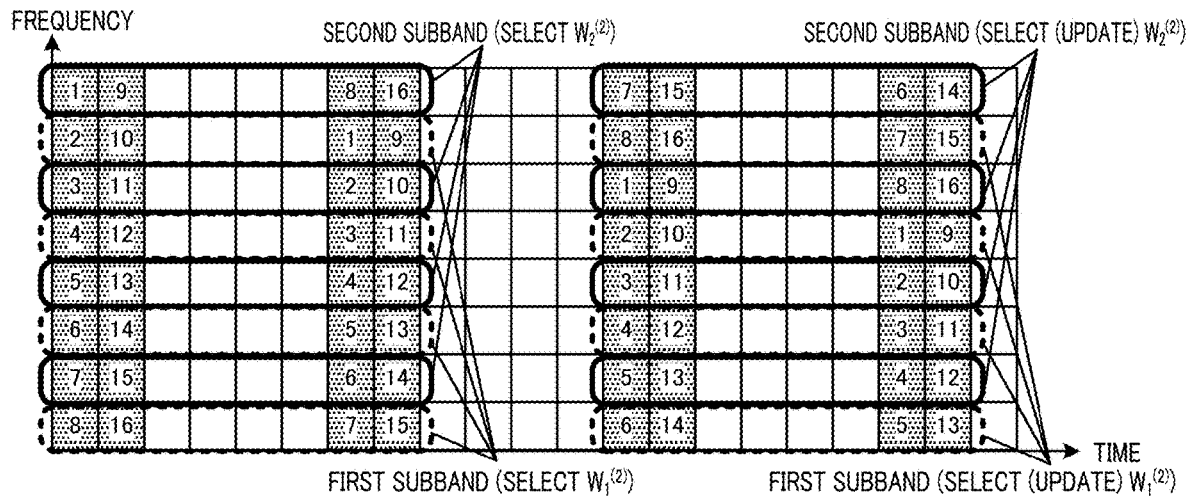
FIG. 7B illustrates an example of frame configuration according to method 2 of the embodiment.
Figure 7C:
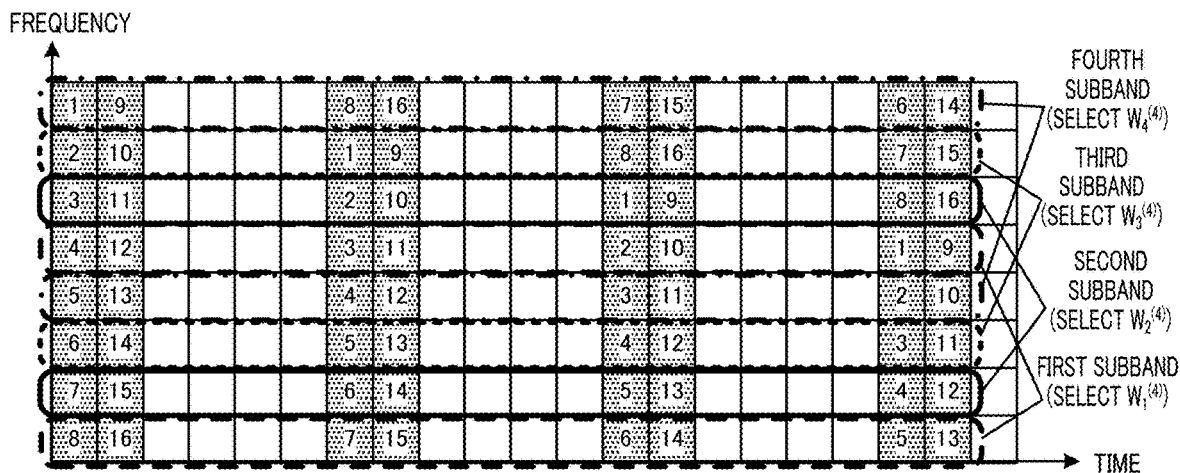
FIG. 7C illustrates an example of frame configuration according to method 2 of the embodiment.

FIGS. 7A to 7C show examples of frame configuration for transmitting the discovery signals. In FIGS. 7A to 7C, the horizontal axis denotes time domains (OFDM symbols), and the vertical axis denotes frequency domains (subcarriers). In the example of FIGS. 7A to 7C, discovery signals multiplied by BF weight candidates #1 to #16 in a transmission band of eight subcarriers are transmitted.

As shown in FIGS. 7A to 7C, the discovery signals multiplied by the BF weight candidates are periodically transmitted (every six OFDM symbols).

As shown in FIGS. 7A to 7C, the discovery signals multiplied by the BF weight candidates are transmitted by shifting the discovery signals in the frequency direction every time the discovery signals are transmitted. Specifically, in FIGS. 7A to 7C, the discovery signals multiplied by the BF weight candidates are disposed by cyclically shifting the discovery signals by one subcarrier in the frequency direction every time the discovery signals are transmitted. In other words, the discovery signals multiplied by all BF weight candidates in each subband are transmitted in FIGS. 7A to 7C as in FIGS. 6A to 6C, and the discovery signals multiplied by the BF weight candidates are cyclically disposed.

For example, in selecting the BF weights when the subbands are not formed as shown in FIG. 7A, radio base station 10 selects one BF weight (for example, expressed as $W_1^{(1)}$) from BF weight candidates #1 to #16 based on the candidate weight information (for example, received power or SNR) generated from the discovery signals of all BF weight candidates #1 to #16 disposed across the entire transmission band (eight subcarriers) of at least one period.

On the other hand, in selecting the BF weights when the transmission band is divided into two subbands as shown in FIG. 7B, radio base station 10 selects BF weights (for example, expressed as $W_1^{(2)}$, $W_2^{(2)}$) from BF weight candidates #1 to #16 based on the candidate weight information (for example, received power or SNR) generated from the discovery signals of all BF weight candidates #1 to #16 disposed across at least two periods of each subband (four subcarriers).

Furthermore, in selecting the BF weights when the transmission band is divided into four subbands as shown in FIG. 7C, radio base station 10 selects BF weights (for example, expressed as $W_1^{(4)}$, $W_2^{(4)}$, $W_3^{(4)}$, $W_4^{(4)}$) from BF weight candidates #1 to #16 based on the candidate weight information (for example, received power or SNR) generated from the discovery signals of all BF weight candidates #1 to #16 disposed across at least four periods of each subband (two subcarriers) as shown in FIG. 7C.

As shown in FIGS. 6A to 6C and 7A to 7C, the subcarriers that transmit the discovery signals multiplied by the BF weight candidates are cyclically shifted in each transmission period. In this way, even when the transmission band is divided into subbands, radio base station 10 can use the discovery signals multiplied by all BF weight candidates in each subband to select the BF weight, that is, select the BF weight from all of the BF weight candidates.

For example, as shown in FIG. 6A or 7A, BF weight $W_1^{(1)}$ in the case that the subbands are not formed is updated at least every period. As shown in FIG. 6B or 7B, BF weights ($W_1^{(2)}$, $W_2^{(2)}$) in the case that the transmission band is divided into two subbands are updated every two periods. As shown in FIG. 6C or 7C, BF weights ($W_1^{(4)}$, $W_2^{(4)}$, $W_3^{(4)}$, $W_4^{(4)}$) in the case that the transmission band is divided into four subbands are updated every four periods (not shown). In this case, radio base station 10 may select the BF weight (that is, judge whether to form the subbands in ST105 shown in FIG. 3) every time the BF weight is updated in one of the patterns for forming the subbands, that is, in FIGS. 6A to 6C or FIGS. 7A to 7C, every time BF weight $W_1^{(1)}$ in the case that the subbands are not formed is updated.

In this way, radio base station 10 looks up (updates) the BF weight in each pattern for forming the subbands including the case that the subbands are not formed, at every certain period. Radio base station 10 determines the optimal BF weight (pattern for forming the subbands) based on the updated BF weight. According to the processing, radio base station 10 can select an appropriate BF weight for the entire transmission band or for each subband according to the frequency characteristics of each frequency band forming the transmission band.

As a result of the disposition of the discovery signals shown in FIGS. 6A to 6C and 7A to 7C, radio base station 10 can select the BF weight to be used for the BF from all of the BF weight candidates regardless of whether the subbands are formed or independently of different patterns for forming the subbands. Therefore, radio base station 10 can simultaneously select BF weight ($W_1^{(1)}$) used in the entire transmission band in the case that the subbands are not formed and BF weights ($W_1^{(2)}$, $W_2^{(2)}$ or $W_1^{(4)}$, $W_2^{(4)}$, $W_3^{(4)}$, $W_4^{(4)}$) used in the subbands in the case that the subbands are formed. According to the processing, radio base station 10 can determine the BF weight to be actually used in beamforming from the BF weights selected at the same time based on the same discovery signal, without transmitting discovery signals corresponding to whether the subbands are formed or corresponding to different patterns for forming the subbands.

Note that the disposition of the discovery signals multiplied by the BF weight candidates is not limited to the examples shown in FIGS. 6A to 6C or FIGS. 7A to 7C. It is only necessary to configure the disposition of the discovery signals multiplied by the BF weight candidates for the purpose of disposing the discovery signals multiplied by all BF weight candidates in each subband according to the configuration of the subbands.

Advantageous Effects of Present Embodiment

In this way, according to the present embodiment, radio base station 10 in the radio communication system for performing the BF in MIMO transmission between radio base station 10 and at least one user terminal 20 includes: weight control section 104 that determines the BF weight used for the BF, for each of the subbands formed by dividing the transmission band; and communication section 109 that transmits the signal to which the BF is applied using the BF weight.

For example, when the frequency characteristics between the subbands are different (when the frequency selectivity is high), radio base station 10 can select the BF weight for each subband according to the channel estimation value of each subband to thereby use an appropriate BF weight according to the frequency characteristics of each subband to perform the beamforming, as compared to the case of selecting the BF weight according to the channel estimation value of the entire transmission band.

In this way, according to the present embodiment, radio base station 10 can appropriately select the BF weight according to the frequency characteristics of each subband, and the transmission efficiency in the MIMO transmission can be improved.

<Modifications>

Note that the parameter used as a reference in selecting the BF weight is not limited to the SNR or the received power in the present embodiment, and some candidate weight information (for example, reception correlation) measured by using the discovery signal multiplied by the BF weight candidate may be used.

In the case described in the present embodiment, the discovery signal transmitted from radio base station 10 to user terminal 20 is used to measure the candidate weight information (for example, received power of BF weight candidate). However, the present embodiment is not limited to this processing, and for example, user terminal 20 may transmit the reference signal to radio base station 10, and radio base station 10 may use the received reference signal to select the BF weight or generate the precoding matrix. According to the processing, the feedback of the discovery signal, the candidate weight information, and channel information (HW) are not necessary. Therefore, the use of the radio resources in the channel estimation processing can be reduced.

In the case described in the present embodiment, the BF weight is selected based on the maximum received power standard. However, the present embodiment is not limited to the processing, and another method, such as a maximum signal to interference power ratio standard, may be used to select the BF weight. For example, radio base station 10 can use the maximum signal to interference power ratio standard to select the BF weight in consideration of the reduction of the interference power.

In the case described in the present embodiment, whether to form subbands is determined based on the maximum signal to interference ratio standard. However, the present embodiment is not limited to the processing, and another method, such as a maximum received power standard, may be used to determine whether to form subbands. For example, radio base station 10 can use the maximum received power standard to judge whether to form subbands in consideration of the improvement of the received power (SNR).

In the case described in the present embodiment, the parameters, such as the number of beams, the number of BF weight candidates, and the beam generation method, are the same between the subbands. However, the parameters may vary between the subbands. According to the configuration, the BF weight can be selected based on parameters suitable for the characteristics (for example, frequency characteristics) of each subband, and the transmission efficiency in each subband can be improved.

In the case described in the present embodiment, radio base station 10 performs the precoding for each of the subcarriers (n). However, the present embodiment is not limited to the processing, and radio base station 10 may, for example, perform the precoding for each of the subbands, just like for the BF weights. According to the processing, radio base station 10 can generate the precoding matrix on the basis of subbands, and the radio resources used for reference signals and the like necessary for generating the precoding matrix can be reduced.

In the case described in embodiments, the reference signal is used to perform the channel estimation. However, the channel estimation value (channel information) may be acquired without using the reference signal in the channel estimation. In other words, it is only necessary to acquire the channel information indicating equivalent channel matrix (HW) including the BF weight in the channel estimation.

In the case described in the present embodiment, radio base station 10 is the transmitter, and user terminal 20 is the receiver in the downlink. However, the present embodiment can also be applied to a case in which user terminal 20 is the transmitter, and radio base station 10 is the receiver in the uplink.

(Hardware Configuration)

Note that the block diagrams used to describe embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

Figure 8:
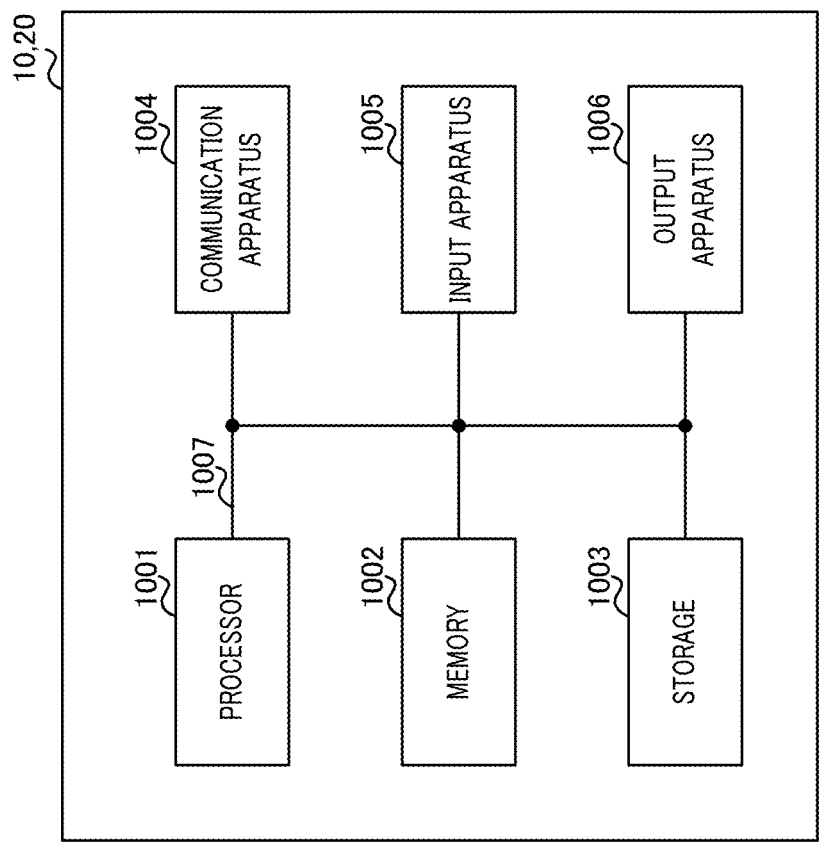
FIG. 8 illustrates an example of a hardware configuration of the radio base station and the user terminal according to the present invention.

For example, the radio base station, the user terminal, and the like according to one embodiment of the present invention may function as a computer that executes processing of a radio communication method of the present invention. FIG. 8 illustrates an example of a hardware configuration of the radio base station and the user terminal according to one embodiment of the present invention. Radio base station 10 and user terminal 20 may be physically formed as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be formed by a central processing unit (CPU) including an interface for peripheral apparatus, a control apparatus, an operation apparatus, a register, and the like. For example, discovery signal generation section 101, candidate weight multiplication section 102, reference signal generation section 103, access point selection section 104, weight selection section 106, judgement section 107, precoding matrix generation section 108, data generation section 109, precoding section 110, beamforming section 111, candidate weight information measurement section 203, channel estimation section 204, postcoding matrix generation section 205, postcoding section 206, data reception section 207, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in embodiments. For example, at least part of the functional blocks forming radio base station 10 and user terminal 20 may be realized by a control program stored in memory 1002 and operated by processor 1001, and the other functional blocks may also be similarly realized. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be formed by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to one embodiment of the present invention.

Storage 1003 is a computer-readable recording medium and may be formed by, for example, at least one of an optical disk such as a CD-ROM (Compact Disc ROM), a hard disk drive, a flexible disk, a magneto-optical disk (for example, a compact disc, a digital versatile disk, or a Blue-ray (registered trademark) disk), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication sections 112 and 202, antennas 113 and 201, inter-base station communication section 105, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by other methods. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station (radio base station) in the specification may be performed by an upper node depending on the situation. Various operations performed for communication with a terminal in a network formed by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Judgement Method)

The judgement may be made based on a value expressed by 1 bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or other remote sources by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompasses a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names. The demodulation RS and the correction RS may be prescribed by the same name (for example, demodulation RS).

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be formed by one or a plurality of frames in the time domain. One or each of a plurality of frames may be called a subframe, a time unit, or the like in the time domain. The subframe may be further formed by one or a plurality of slots in the time domain. The slot may be further formed by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, a mini slot, and the symbol indicate time units in transmitting signals. The radio frame, the subframe, the slot, the mini slot, and the symbol may be called by other corresponding names.

For example, in the LTE system, the base station creates a schedule for assigning a radio resource to each mobile station (such as frequency bandwidth that can be used by each mobile station and transmission power). The minimum time unit of scheduling may be called a TTI (Transmission Time Interval), or one mini slot may be called a TTI.

For example, one subframe may be called a TTI. A plurality of contiguous subframes may be called a TTI. One slot may be called a TTI.

The resource unit is a resource assignment unit of the time domain and the frequency domain, and the resource unit may include one or a plurality of contiguous subcarriers in the frequency domain. One or a plurality of symbols may be included in the time domain of the resource unit, and the length may be one slot, one mini slot, one subframe, or one TTI. One TTI and one subframe may be formed by one or a plurality of resource units. The resource unit may be called a resource block (RB), a physical resource block (PRB: Physical RB), a PRB pair, an RB pair, a scheduling unit, a frequency unit, or a subband. The resource unit may be formed by one or a plurality of REs. For example, it is only necessary that one RE be a resource in a unit (for example, minimum resource unit) smaller than the resource unit serving as a resource assignment unit, and the naming is not limited to RE.

The structure of the radio frame is exemplary only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be combined and used, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to the embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-

033671 filed on Feb. 24, 2017, and the entire content of Japanese Patent Application No. 2017-033671 is hereby incorporated by reference.

INDUSTRIAL APPLICABILITY

An aspect of the present invention is useful for a mobile communication system.

REFERENCE SIGNS LIST

10 Radio base station
20 User terminal
101 Discovery signal generation section
102 Candidate weight multiplication section
103 Reference signal generation section
104 Weight control section
105 Precoding matrix generation section
106 Data generation section
107 Precoding section
108 Beamforming section
109, 202 Communication section
110, 201 Antenna
161 Coding section
162 Modulation section
203 Candidate weight information measurement section
204 Channel estimation section
205 Postcoding matrix generation section
206 Postcoding section
207 Data reception section
271 Demodulation section
272 Decoding section

The invention claimed is:

1. A radio base station in a radio communication system that performs beamforming in MIMO transmission between the radio base station and at least one user terminal, the radio base station comprising:
a processor that determines a beamforming weight to be used for the beamforming, for each of subbands formed by dividing a transmission band; and
a transmitter that transmits a signal to which the beamforming is applied using the beamforming weight,
wherein the processor further determines a beamforming weight for an entirety of the transmission band and selects one of the beamforming weight for each of the subbands and the beamforming weight for the entirety of the transmission band.

2. The radio base station according to claim 1, wherein each of the subbands is formed by contiguous subcarriers among a plurality of subcarriers forming the transmission band.

3. The radio base station according to claim 1, wherein each of the subbands is formed by discontiguous subcarriers among a plurality of subcarriers forming the transmission band.

4. A radio communication method in a radio communication system that performs beamforming in MIMO transmission between a radio base station and at least one user terminal, the radio communication method comprising:
determining a beamforming weight used for the beamforming, for each of subbands formed by dividing a transmission band;
transmitting a signal to which the beamforming is applied using the beamforming weight;
determining a beamforming weight for an entirety of the transmission band; and
selecting one of the beamforming weight for each of the subbands and the beamforming weight for the entirety of the transmission band.

* * * * *